Oct. 23, 1928. 1,689,031

B. HOSSARD

CASTER

Filed Nov. 7, 1927

INVENTOR
Baptiste Hossard
BY
*[signature]*
ATTORNEY

Patented Oct. 23, 1928.

1,689,031

UNITED STATES PATENT OFFICE.

BAPTISTE HOSSARD, OF MASPETH, NEW YORK.

CASTER.

Application filed November 7, 1927. Serial No. 231,503.

This invention relates generally to roller wheels and has more particular reference to casters for use on beds, pianos, or other desirable places.

The invention has for an object the provision of a caster of novel construction and arrangement of parts, which can be manufactured and sold at a reasonable cost.

It is customary to make the wheels of casters from metal or wood, and each of these have faults which the present invention overcomes. A common fault is that after a short period of use, both look very dirty, that is, dirt adheres to them very readily. Furthermore, the wooden wheels decay and wear out very easily, while the metallic ones tarnish or rust. These and many other faults are overcome in the instant invention by making the wheels of rubber. The invention is not limited to any partictular shape of the wheel, several shapes are therefore shown on the drawing.

For further comprehension of the invention and of the objects and advantages thereof, reference will be had to the following description and accompanying drawing, and to the appended claims in which the various novel features of the invention are more particularly set forth.

Referring to the accompanying drawing forming a material part of this disclosure:

Fig. 4 is a view similar to Fig. 3 but showing a modified form of caster wheel.

Figure 1:
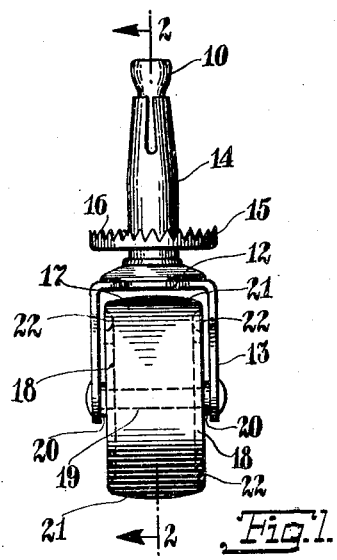
Fig. 1 is a front view of a caster constructed according to this invention.
Figure 2:
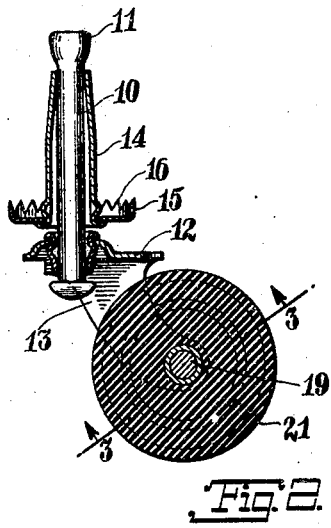
Fig. 2 is a vertical central sectional view thereof, taken on the line 2—2 of Fig. 1.
Figure 3:
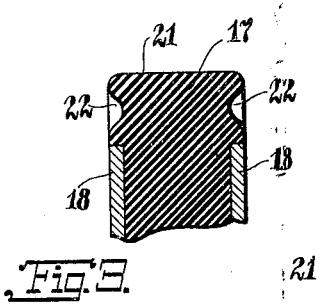
Fig. 3 is a fragmentary sectional view taken on the line 3—3 of Fig. 2.
Figure 7:
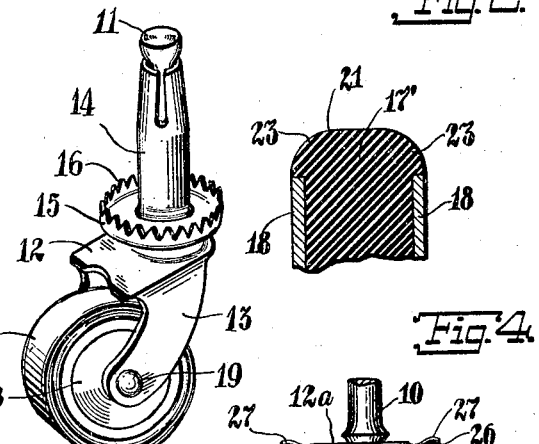
Fig. 7 is a perspective view showing my device.

The reference numeral 10 indicates a post having at its upper end an enlarged portion 11 and the lower end of the post is riveted to the central part of a bracket 12 having depending side arms 13. A tubular member 14 is slidably arranged on the post, and has a depressed upper end abuttable against the portion 11, the lower end of the post being riveted to a cup 15 formed with top serrations 16. A wheel 17 preferably of hard rubber or any similar composition has discs 18 of metal engaged in the sides thereof, and this wheel is supported by a rivet 19 engaged through the arms 13 while washers 20 on the rivet are positioned between the discs 18 and the arms 13.

Figure 5:
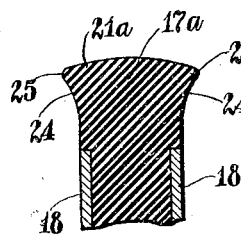
Fig. 5 is another similar view showing another modification.

The periphery of wheel 17 is slightly curved, indicated by numeral 21 and the sides are formed with annular cutouts 22. The wheel shown in Fig. 4, namely 17', has a flat top 21' and curved corners 23. The wheel 17ª of Fig. 5 has a curved top 21ª and curved sides 24 forming points 25 with the top, that is, the periphery.

Figure 6:
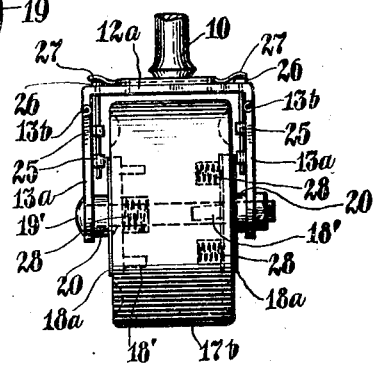
Fig. 6 is a fragmentary front view of a caster of modified form.

The modification illustrated in Fig. 6 discloses a bracket 12ª having sides 13ª hingedly connected as at 13ᵇ. The sides 13ª have projecting lugs 25 and bolts 26 pass through the top of the bracket 12ª and through the lugs, locking the sides in vertical position. Springs 27 hold these bolts against displacement. The wheel 17ᵇ is formed with apertures engaged by pegs 18' from the inner sides of the discs 18 and the discs are urged outwards by springs 28 housed in recesses in the wheel 17ᵇ. The discs 18ª are urged against the washers 20 acting as thrust bearings for the wheel 17ᵇ. A bolt 19 serves to rotatably hold the caster wheel. Hinges 13ᵇ are of the type in which a pintle pin may be withdrawn to disconnect the hinge members so that the wheel 17ᵇ and sides 13ª may be removed and replaced from the bracket 12ª.

It is to be understood that my caster may be constructed in any size to suit any furniture and on account of the rubber composition of the roller, it may be safely used on any carpet or on polished floors which will remain unscratched and will stay in position on account of the friction between the rubber and the flooring.

While I have illustrated and described the preferred form, construction, and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:

1. A caster, comprising a bracket adapted for engagement in a socket member, and having hingedly connected side members adapted for convenient disconnection, a wheel rotatively arranged on the side members, bolts passing thru the tops of the bracket and thru the lugs and arranged for locking the side members in vertical positions, and means for holding the bolts against displacement.

2. A caster, comprising a bracket adapted for engagement in a socket member, and having hingedly connected side members adapted for convenient disconnection, a wheel rotatively arranged on the side members, lugs projecting from the said side members, bolts passing thru the tops of the bracket and thru the lugs and arranged for locking the side members in vertical positions, and springs for holding the bolts against displacement.

3. A caster, comprising a rubber wheel, a bracket adapted for engagement in a socket member, and having hingedly connected side members adapted for convenient disconnection and arranged for rotatively supporting the wheel, and bolts passing thru the bracket and arranged for holding the side members in vertical positions.

In testimony whereof I have affixed my signature.

BAPTISTE HOSSARD.